(12) United States Patent
Hong

(10) Patent No.: US 7,705,813 B2
(45) Date of Patent: Apr. 27, 2010

(54) LIQUID CRYSTAL DISPLAY PANEL AND METHOD OF DRIVING THE SAME

(75) Inventor: Hyung Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1168 days.

(21) Appl. No.: 11/301,145

(22) Filed: Dec. 13, 2005

(65) Prior Publication Data
US 2006/0145987 A1    Jul. 6, 2006

(30) Foreign Application Priority Data
Dec. 31, 2004    (KR) .................. 10-2004-0118562

(51) Int. Cl.
*G09G 3/36* (2006.01)
(52) U.S. Cl. .................. 345/87; 345/88; 345/89; 345/96; 345/55; 345/204
(58) Field of Classification Search ............ 345/87–89, 345/96, 55, 204
See application file for complete search history.

(56) References Cited

U.S. PATENT DOCUMENTS
2005/0140620 A1 *   6/2005   Aoyama et al. ............... 345/87

* cited by examiner

*Primary Examiner*—Richard Hjerpe
*Assistant Examiner*—Leonid Shapiro
(74) *Attorney, Agent, or Firm*—McKenna Long & Aldridge

(57) ABSTRACT

This invention relates to a three electrode liquid crystal display panel that is adaptive for AC-driving liquid crystal cells inclusive of three electrodes, and a driving method thereof.

A three electrode liquid crystal display panel according to an embodiment of the present invention includes first and second pixel electrodes disposed on a first substrate with an insulating film therebetween; and a common electrode disposed in a second substrate which is bonded with the first substrate with a liquid crystal therebetween, and wherein the first pixel electrode selectively supplies a maximum voltage and a minimum voltage, the common electrode supplies a medium voltage between the maximum voltage and the minimum voltage as a reference voltage, and the second pixel electrode supplies a positive data voltage and a negative data voltage on the basis of the reference voltage in a range between the maximum voltage and the minimum voltage, thereby AC-driving the liquid crystal.

25 Claims, 7 Drawing Sheets

LIQUID CRYSTAL DISPLAY PANEL AND METHOD OF DRIVING THE SAME

This application claims the benefit of the Korean Patent Application No. P2004-118562 filed on Dec. 31, 2004, which is hereby incorporated by reference for all purposes as if fully set forth herein.

BACKGROUND OF THE INVENTION

1. Field of the Invention

The present invention relates to a liquid crystal display device, and more particularly to a liquid crystal display panel using three electrodes, and a driving method thereof.

2. Discussion of the Related Art

A liquid crystal display device controls the light transmittance of a liquid crystal having a dielectric anisotropy using an electric field, thereby displaying a picture. The liquid crystal display device includes a liquid crystal display panel that displays a picture through a liquid crystal cell matrix, and a drive circuit for driving the liquid crystal display panel.

Referring to FIG. 1, a liquid crystal display panel of the related art includes a color filter substrate 10 bonded to a thin film transistor substrate 20 with a liquid crystal 24 therebetween.

The color filter substrate 10 includes a black matrix 4, a color filter 6 and a common electrode 8 that are sequentially formed on an upper glass substrate 2. The black matrix 4 is formed in a matrix shape on the upper glass substrate 2. The black matrix 4 divides the area of the upper glass substrate 2 into a plurality of cell areas where a color filter 6 is to be formed, and prevents light interference between adjacent cells and external light reflection. The color filter 6 is formed to be divided into red R, green G and blue B in the cell area by the black matrix 4, to transmit red, green, and blue light. The common electrode 8 supplies a common voltage Vcom, which is a standard when driving a liquid crystal 24, to a transparent conductive layer over the entire surface of the color filter 6. And, an overcoat layer (not shown) may be further formed between the color filter 6 and the common electrode 8 in order to level the color filter 6.

The thin film transistor substrate 20 includes a thin film transistor 18 and a pixel electrode 22 which are formed at each cell area defined by the crossing of a gate line 14 and a data line 12 on a lower glass substrate 12. The thin film transistor 18 supplies a data signal from the data line 16 to the pixel electrode 22 in response to a gate signal from the gate line 12. The pixel electrode 22 formed of a transparent conductive layer drives the liquid crystal according to the data signal from the thin film transistor 18.

The liquid crystal 24 having a dielectric anisotropy rotates in accordance with an electric field formed by the data signal on the pixel electrode 22 and the common voltage Vcom on the common electrode 8 to control the light transmittance, thereby realizing a gray level.

The liquid crystal display panel further includes a spacer (not shown) to fix a cell gap between the color filter substrate 10 and the thin film transistor substrate 20.

The related art liquid crystal display panel is an active matrix type because a thin film transistor acting as a device is formed at each liquid crystal cell; thus it is suitable to display motion picture. The related art liquid crystal display panel has a disadvantage in that a motion blurring phenomenon occurs because of a slow response speed caused by the viscosity and elasticity of the liquid crystal.

Accordingly, a three electrode liquid crystal display panel has been recently proposed that may improve the response speed by forming an electric field in horizontal or vertical direction by applying different voltages to three electrodes, i.e., the common electrode and the first and second pixel electrodes. In the three electrode liquid crystal display panel, the liquid crystal cell where the horizontal electric field is formed by the three electrodes displays white, and the liquid crystal cell where the vertical electric field is formed displays black, thus the white and black gray levels are all determined by the electric field applied to the liquid crystal cell. Accordingly, the response speed may be improved in comparison with the existing liquid crystal display panel where the liquid crystal is restored to an initial alignment state when there is no electric field.

However, the three electrode liquid crystal display panel should drive the liquid crystal with alternating current (AC) in order to prevent the liquid crystal from deteriorating, but the AC driving method has not yet been proposed. Accordingly, a specific driving method for AC-driving the three electrode liquid crystal display panel and a three electrode structure which is suitable for AC-driving is required.

SUMMARY OF THE INVENTION

Accordingly, the present invention is directed to a liquid crystal display and method of driving the same that substantially obviates one or more of the problems due to limitations and disadvantages of the related art.

An advantage of the present invention is to provide a three electrode liquid crystal display panel that is capable of AC-driving liquid crystal cells with three electrodes and a driving method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel, including: first and second pixel electrodes on a first substrate with an insulating film therebetween; and a common electrode on a second substrate which is bonded with the first substrate with a liquid crystal therebetween, and wherein a maximum voltage and a minimum voltage are selectively applied to the first pixel electrode, a medium voltage with a voltage level between the maximum voltage and the minimum voltage is applied to the common electrode, and a positive data voltage and a negative data voltage that are relative to the medium voltage and in a range between the maximum voltage and the minimum voltage are applied to the second pixel electrode.

In another aspect of the present invention, a liquid crystal display panel, includes: a first pixel electrode is disposed on a first substrate with an insulating film therebetween and is applied is applied a medium voltage with a voltage level between the maximum voltage and the minimum voltage; a second pixel electrode is disposed on a first substrate with an insulating film therebetween and is applied a positive data voltage and a negative data voltage that are relative to the medium voltage and in a range between the maximum voltage and the minimum voltage; and a common electrode is disposed on a second substrate which is bonded with the first substrate with a liquid crystal therebetween and is selectively applied a maximum voltage and a minimum voltage; and wherein the liquid crystal is driven with alternating current.

In another aspect of the present invention, a driving method of a liquid crystal display panel, includes: selectively applying a maximum voltage and a minimum voltage to a first pixel electrode formed on a first substrate; applying a medium voltage with a voltage level between the maximum voltage and the minimum voltage to a common electrode of a second substrate, which together with the first substrate has a liquid crystal therebetween; and applying a positive data voltage and a negative data voltage that are relative to the medium voltage and in a range between the maximum voltage and the minimum voltage to a second pixel electrode which overlaps the first pixel electrode with an insulating film therebetween, and wherein the liquid crystal is driven with alternating current.

In another aspect of the present invention, a driving method of a liquid crystal display panel, includes: selectively applying a maximum voltage and a minimum voltage to a common electrode formed on a first substrate; applying a medium voltage with a voltage level between the maximum voltage and the minimum voltage to a first pixel electrode of a second substrate, which together with the first substrate has a liquid crystal therebetween; and applying a positive data voltage and a negative data voltage that is relative to the medium voltage in a range between the maximum voltage and the minimum voltage to a second pixel electrode, which overlaps the first pixel electrode with an insulating film therebetween, and wherein the liquid crystal is driven with alternating current.

It is to be understood that both the foregoing general description and the following detailed description are exemplary and explanatory and are intended to provide further explanation of the invention as claimed.

In order to achieve these and other advantages of the invention, a liquid crystal display panel according to an aspect of the present invention includes first and second pixel electrodes disposed on a first substrate with an insulating film therebetween; and a common electrode disposed in a second substrate which is bonded with the first substrate with a liquid crystal therebetween, and wherein the first pixel electrode selectively supplies a maximum voltage and a minimum voltage, the common electrode supplies a medium voltage between the maximum voltage and the minimum voltage as a reference voltage, and the second pixel electrode supplies a positive data voltage and a negative data voltage on the basis of the reference voltage in a range between the maximum voltage and the minimum voltage, thereby AC-driving the liquid crystal.

A liquid crystal display panel according to another aspect of the present invention includes first and second pixel electrodes disposed on a first substrate with an insulating film therebetween; and a common electrode disposed in a second substrate which is bonded with the first substrate with a liquid crystal therebetween, and wherein the common electrode selectively supplies a maximum voltage and a minimum voltage, the first pixel electrode supplies a medium voltage between the maximum voltage and the minimum voltage as a reference voltage, and the second pixel electrode supplies a positive data voltage and a negative data voltage on the basis of the reference voltage in a range between the maximum voltage and the minimum voltage, thereby AC-driving the liquid crystal.

The liquid crystal display panel further includes a thin film transistor which is connected to the second pixel electrode on the first substrate and supplies the positive and negative data voltages from a drive circuit; and a gate line and a data line which are connected to the thin film transistor.

The liquid crystal display panel further includes a pad which is connected to the first pixel electrode on the first substrate and supplies the maximum voltage and the minimum voltage from the drive circuit.

In the liquid crystal display panel, as a voltage of the second pixel electrode is further from a voltage of the first pixel electrode that the common electrode, a horizontal electric field component is increased to drive the liquid crystal in a white state, and as the voltage of the second pixel electrode is closer to the voltage of the first pixel electrode that the common electrode, a vertical electric field component is increased to drive the liquid crystal in a black state.

In the liquid crystal display panel, a positive voltage is applied to the liquid crystal if the first pixel electrode supplies the maximum voltage and the second pixel electrode supplies the positive data voltage, and a negative voltage is applied to the liquid crystal if the first pixel electrode supplies the minimum voltage and the second pixel electrode supplies the negative data voltage.

In the liquid crystal display panel, the common electrode is formed in an integrated entire surface electrode structure, and the first pixel electrode is a structure of a plurality of stripes which are independent for each liquid crystal cell that is defined by the crossing of the gate line and the data line.

In the liquid crystal display panel, the first pixel electrode is formed in a dot electrode structure for each liquid crystal cell which is defined by the crossing of the gate line and the data line, and the first pixel electrode is commonly connected to a first pixel electrode which is formed in a liquid crystal cell of the same polarity.

In the liquid crystal display panel, the first pixel electrode supplies any one voltage of the maximum voltage and the minimum voltage which is opposite to that of an adjacent first pixel electrode in vertical or horizontal directions, and the second pixel electrode supplies a data voltage of a polarity which is opposite to that of an adjacent second pixel electrode in the vertical and horizontal directions, thereby making the polarity of the liquid crystal cell inverted for each liquid crystal cell.

In the liquid crystal display panel, the first pixel electrode is formed in an integrated entire surface electrode structure.

In the liquid crystal display panel, the first pixel electrode alternately supplies the maximum voltage and the minimum voltage for each frame, and the second pixel electrode alternately supplies the positive and negative data voltages for each frame, thereby making the polarity of the liquid crystal cell inverted for each frame.

In the liquid crystal display panel, the common electrode alternately supplies the maximum voltage and the minimum voltage for each frame, and the second pixel electrode alternately supplies the positive and negative data voltages for each frame, thereby making the polarity of the liquid crystal cell inverted for each frame.

In the liquid crystal display panel, the first pixel electrode is formed in a line electrode structure where the first pixel electrode is divided for each vertical or horizontal line.

In the liquid crystal display panel, the first pixel electrode alternately supplies the maximum voltage and the minimum voltage for each horizontal or vertical line, and the second pixel electrode alternately supplies the positive and negative voltages for each horizontal or vertical line, thereby making the polarity of the liquid crystal cell inverted for each horizontal or vertical line.

In the liquid crystal display panel, in case that the first pixel electrode is divided for each horizontal line, the thin film transistor is alternately connected to two adjacent gate lines.

In the liquid crystal display panel, the data line supplies a data voltage of which the polarity is inverted for each horizontal and vertical line, thereby making the polarity of the liquid crystal cell inverted for each horizontal line.

A driving method of a liquid crystal display panel according to still another aspect of the present invention includes the steps of selectively supplying a maximum voltage and a minimum voltage to a first pixel electrode formed on a first substrate; supplying a medium voltage between the maximum voltage and the minimum voltage as a reference voltage to a common electrode of a second substrate which together with the first substrate has a liquid crystal therebetween; and supplying a positive data voltage and a negative data voltage on the basis of the reference voltage in a range between the maximum voltage and the minimum voltage to a second pixel electrode which overlaps the first pixel electrode with an insulating film therebetween, and wherein the liquid crystal is driven with alternating current.

A driving method of a liquid crystal display panel according to still another aspect of the present invention includes the steps of selectively supplying a maximum voltage and a minimum voltage to a common electrode formed on a first substrate; supplying a medium voltage between the maximum voltage and the minimum voltage as a reference voltage to a first pixel electrode of a second substrate which together with the first substrate has a liquid crystal therebetween; and supplying a positive data voltage and a negative data voltage on the basis of the reference voltage in a range between the maximum voltage and the minimum voltage to a second pixel electrode which overlaps the first pixel electrode with an insulating film therebetween, and wherein the liquid crystal is driven with alternating current.

In the driving method, the positive and negative data voltages are supplied through a data line and a thin film transistor.

In the driving method, the maximum voltage and the minimum voltage are supplied through a pad.

In the driving method, as a voltage of the second pixel electrode is further from a voltage of the first pixel electrode that the common electrode, a horizontal electric field component is increased to drive the liquid crystal in a white state, and as the voltage of the second pixel electrode is closer to the voltage of the first pixel electrode that the common electrode, a vertical electric field component is increased to drive the liquid crystal in a black state.

In the driving method, a positive voltage is applied to the liquid crystal if the first pixel electrode supplies the maximum voltage and the second pixel electrode supplies the positive data voltage, and a negative voltage is applied to the liquid crystal if the first pixel electrode supplies the minimum voltage and the second pixel electrode supplies the negative data voltage.

In the driving method, the first pixel electrode formed in a dot electrode structure for each liquid crystal cell supplies any one voltage of the maximum voltage and the minimum voltage which is opposite to that of an adjacent first pixel electrode in vertical or horizontal directions, and the second pixel electrode which is independent for each liquid crystal cell supplies a data voltage of a polarity which is opposite to that of an adjacent second pixel electrode in the vertical and horizontal directions, thereby making the polarity of the liquid crystal cell inverted for each liquid crystal cell.

In the driving method, the first pixel electrode formed in an entire surface electrode structure alternately supplies the maximum voltage and the minimum voltage for each frame, and the second pixel electrode which is independent for each liquid crystal cell alternately supplies the positive and negative data voltages for each frame, thereby making the polarity of the liquid crystal cell inverted for each frame.

In the driving method, the common electrode formed in an entire surface electrode structure alternately supplies the maximum voltage and the minimum voltage for each frame, and the second pixel electrode which is independent for each liquid crystal cell alternately supplies the positive and negative data voltages for each frame, thereby making the polarity of the liquid crystal cell inverted for each frame.

In the driving method, the first pixel electrode divided for each horizontal line alternately supplies the maximum voltage and the minimum voltage for each horizontal line, and the second pixel electrode which is independent for each liquid crystal cell alternately supplies the positive and negative voltages for each horizontal line, thereby making the polarity of the liquid crystal cell inverted for each horizontal line.

In the driving method, the first pixel electrode divided for each vertical line alternately supplies the maximum voltage and the minimum voltage for each vertical line, and the second pixel electrode which is independent for each liquid crystal cell alternately supplies the positive and negative voltages for each vertical line, thereby making the polarity of the liquid crystal cell inverted for each vertical line.

In the driving method, in case that the second pixel electrode divided for each liquid crystal cell is connected to a thin film transistor and the thin film transistor is alternately connected to two adjacent gate lines, the first pixel electrode divided for each horizontal line alternately supplies the maximum voltage and the minimum voltage for each horizontal line, and a data line connected to the thin film transistor supplies a data voltage of which the polarity is inverted for each horizontal and vertical line, thereby making the polarity of the liquid crystal cell inverted for each horizontal line.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to the preferred embodiments of the present invention, examples of which are illustrated in the accompanying drawings.

With reference to FIGS. 2 to 7B, embodiments of the present invention will be explained as follows.

Figure 1:
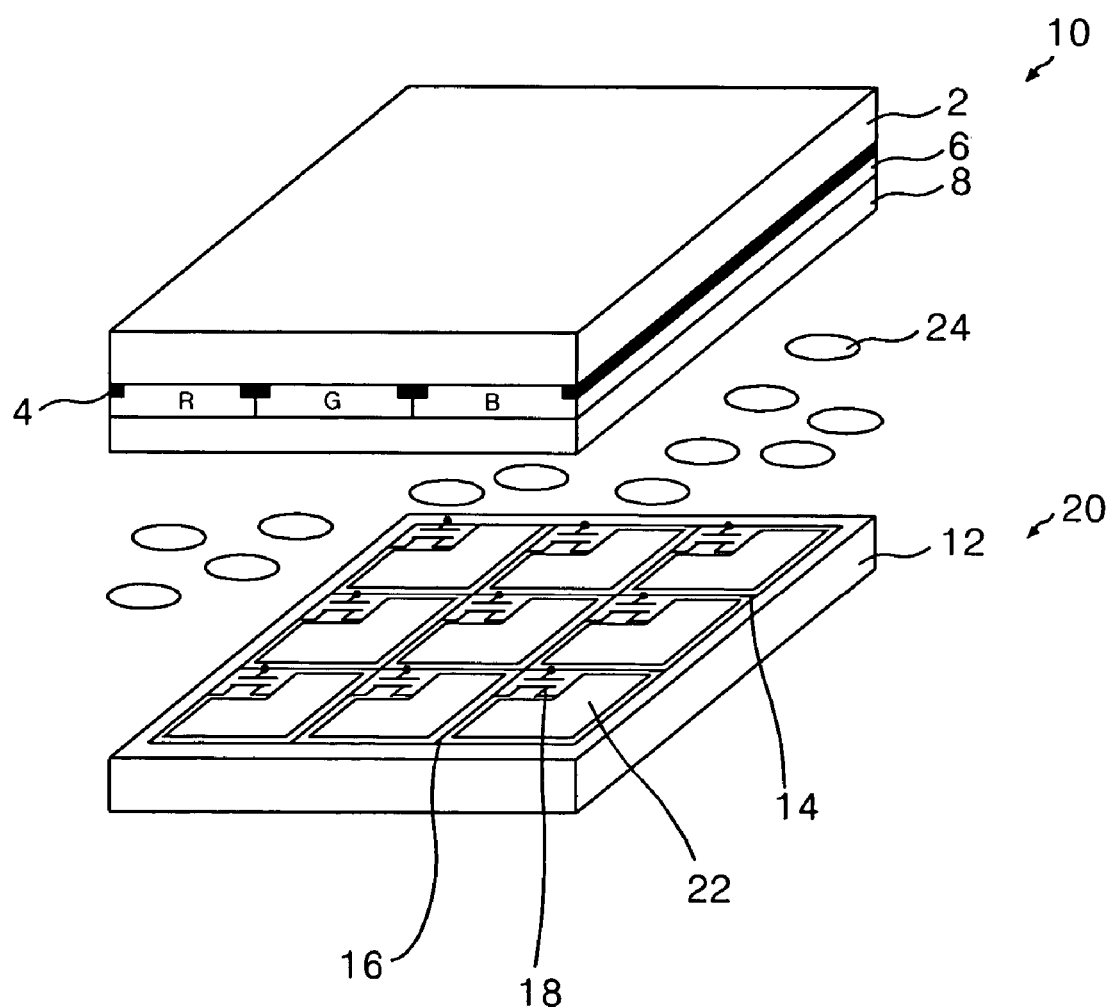
FIG. 1 is a perspective diagram illustrating a liquid crystal display panel structure of the related art.
Figure 2:
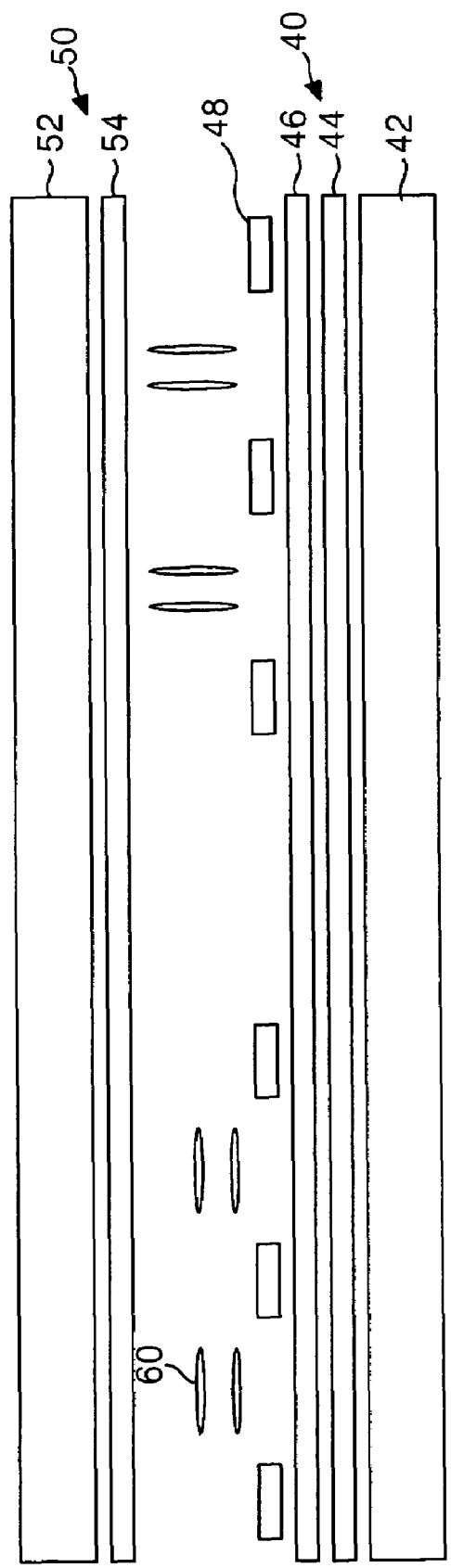
FIG. 2 is a sectional diagram illustrating a liquid crystal display panel structure according to the present invention.

FIG. 2 is a sectional diagram illustrating two liquid crystal cell parts in a three electrode liquid crystal display panel according to an embodiment of the present invention.

The three electrode liquid crystal display panel shown in FIG. 2 includes a thin film transistor substrate 40 and a color filter substrate 50 that are bonded with a liquid crystal 60 therebetween.

The color filter substrate 50 includes a common electrode 54 formed of a transparent conductive layer over the entire surface of an upper substrate 52. A reference voltage V1 that is the standard value for driving a liquid crystal cell is supplied to the common electrode 54. The color filter substrate 50 further includes a color filter and a black matrix (not shown) which are formed between the upper substrate 52 and the common electrode 54.

The thin film transistor substrate 40 includes first and second pixel electrodes 44, 48 disposed on a lower substrate 42 with an insulating film 46 therebetween, and a thin film transistor (not shown) connected to the second pixel electrode 48.

The first pixel electrode 44 is formed of a transparent conductive layer. The first pixel electrode 44 is formed on the entire surface of the lower substrate 42. The first pixel electrode 44 selectively receives a maximum voltage Vmax and a minimum voltage Vmin from a data driver through a pad. An insulating film 46 is formed between the first pixel electrode 44 and the second pixel electrode 48.

The second pixel electrode 48 are elongated lines overlapping the first pixel electrode 44 with the insulating film 46 therebetween The second pixel electrode 48 is formed on the insulating film 46. The second pixel electrode 48 for each liquid crystal cell is connected to the corresponding thin film transistor. The second pixel electrode 48 receives a data voltage V2 supplied from a data driver through the thin film transistor. Accordingly, the second pixel electrode 48 forms a horizontal electric field with the first pixel electrode 44 or forms a vertical electric field with the common electrode 54 together with the first pixel electrode to drive the liquid crystal 60.

Particularly, if the same voltage is applied to the second pixel electrode 48 as to the common electrode 54 and another voltage is applied to the first pixel electrode 44, the second pixel electrode 48 forms a horizontal electric field in accordance with a voltage difference with the first pixel electrode 44, thus the liquid crystal 60 has a white state. On the contrary, if the same voltage is applied to the first and second pixel electrodes 44, 48 and another voltage is applied to the common electrode 54, a vertical electric field component depending on a voltage between the first and second pixel electrodes 48 and the common electrode 54 becomes greater, thus the liquid crystal 60 has a black state.

That is to say, as a voltage of the second pixel electrode 48 gets further from the voltage of the first pixel electrode 44 than the common electrode 54, the horizontal electric field component is increased so that the liquid crystal 60 is in the white state. On the contrary, as a voltage of the second pixel electrode 48 gets closer to the voltage of the first pixel electrode 44 than the common electrode 54, the vertical electric field component is increased so that the liquid crystal 60 is in the black state.

In this case, the liquid crystal 60 may be in the white and black states even when the liquid crystal is horizontally aligned, besides when the liquid crystal of any one or both sides of the thin film transistor substrate 40 and the color filter substrate 50 is vertically aligned.

In order to AC-drive the liquid crystal 60, the first and second pixel electrodes 44, 48 and the common electrode 54 receive a voltage as in the following TABLE 1.

TABLE 1

| | Common electrode (54) | Second pixel electrode (48) | First pixel electrode (44) |
|---|---|---|---|
| Positive (+) | V1 | V1 + Vb | Vmax |
| Negative (−) | V1 | V1 − Vb | Vmin |

Figure 3:
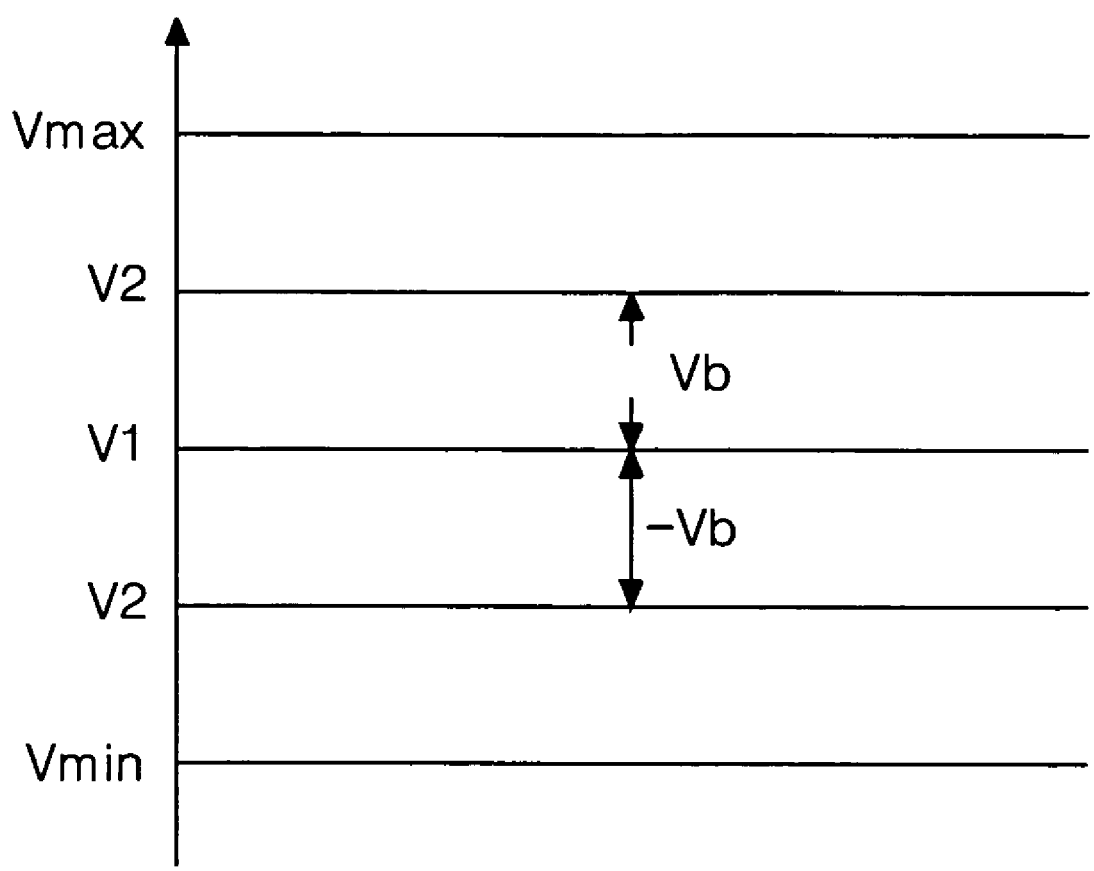
FIG. 3 is a diagram illustrating a voltage relationship of three electrodes shown in FIG. 2.

In TABLE 1, a reference voltage V1 supplied to the common electrode 54, a data voltage (V1+Vb, V1−Vb) supplied in accordance with a video data to the second pixel electrode 48, and a maximum voltage Vmax and a minimum voltage Vmin of the data driver supplied to the first pixel electrode 44 have relative magnitudes as shown in FIG. 3.

Referring to FIG. 3, a medium voltage between the maximum voltage Vmax and the minimum voltage Vmin supplied to the first pixel electrode 44, i.e., a reference voltage V1 corresponding to (Vmax+Vmin)/2, is supplied to the common electrode 54 for AC-driving. A voltage V2 between the maximum voltage Vmax and the minimum voltage Vmin, i.e., a data voltage (V2=V1+Vb, V2=V1−Vb) corresponding to Vmax>V2>Vmin, is supplied to the second pixel electrode 48. Accordingly, the positive (+) or negative (−) voltage can be supplied to the liquid crystal 60 in accordance with the voltage supplied to the first and second pixel electrodes 44, 48 on the basis of the reference voltage V1 of the common electrode 54.

A dot inversion method where the polarity is inverted for each liquid crystal cell, a frame inversion method where the polarity is inverted for each frame, and a line inversion method where the polarity is inverted for each line may be used to AC-drive the liquid crystal 60 in the three electrode liquid crystal display panel. In this case, the common electrode 54 and the second pixel electrode 48 are formed using the same structure as shown in FIG. 2 regardless of the inversion method. On the contrary, the first pixel electrode 44 is to be formed using a different electrode structure according to the inversion method. Specifically, the first pixel electrode 44 has to be formed in a dot electrode structure for the dot inversion method, in an entire surface electrode structure for the frame inversion method, and in a line electrode structure for the line inversion method.

Figure 4:
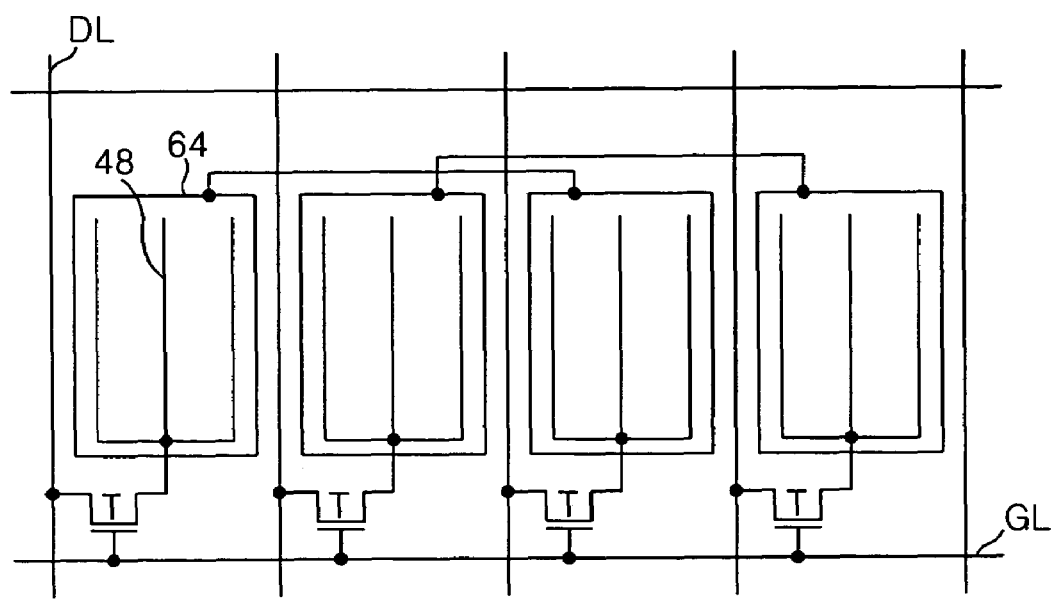
FIG. 4 is a plane view illustrating the structure of a thin film transistor substrate in the liquid crystal display panel according to a first embodiment of the present invention.

FIG. 4 is a plane view illustrating the structure of a thin film transistor substrate in the three electrode liquid crystal display panel which is applied to a dot inversion method.

The thin film transistor substrate shown in FIG. 4 includes first and second pixel electrodes 64, 48 formed in each liquid crystal cell area which is defined by the crossing of a gate line GL and a data line DL and a thin film transistor T connected between the gate line GL, the data line DL and the second pixel electrode 48.

The first pixel electrode 64 is formed in the dot electrode structure in each liquid crystal cell area which is defined by the crossing of the gate line GL and the data line DL. The first pixel electrode 64 is commonly connected to a first pixel electrode 64 which is formed in a liquid crystal cell area of the same polarity. For example, the first pixel electrode 64 of a first liquid crystal cell area is connected to the first pixel electrode 64 of a third liquid crystal cell area, and the first pixel electrode 64 of a second liquid crystal cell area is connected to the first pixel electrode 64 of a fourth liquid crystal cell area. Accordingly, the maximum voltage Vmax of the data driver is supplied through a pad to the first pixel electrode 64 of the liquid crystal cell area to which the positive (+) voltage is to be supplied, and the minimum voltage Vmin of the data driver is supplied to the first pixel electrode 64 of the liquid crystal cell area to which the negative (−) voltage is to be supplied.

The second pixel electrode 48 connected to the thin film transistor is formed as elongated lines where the second pixel electrode 48 overlaps the first pixel electrode with an insulating film therebetween. The positive (+) data voltage (V2=V1+Vb) is supplied through the data line DL and the thin film transistor T to the second pixel electrode of the liquid crystal cell area to which the positive (+) voltage is to be supplied, and the negative (−) data voltage (V2=V1−Vb) is supplied through the data line DL and the thin film transistor T to the second pixel electrode of the liquid crystal cell area to which the negative (−) voltage is to be supplied. The data voltage V2 of opposite polarity to the second pixel electrode 48 which is adjacent in horizontal and vertical directions is applied to the second pixel electrode 48 for dot inversion driving.

Accordingly, as in TABLE 1, the maximum voltage Vmax and the positive (+) data voltage (V2=V1+Vb) can be supplied to each of the first and second pixel electrodes 64, 48 of the positive (+) liquid crystal cell, and the minimum voltage Vmin and the negative (−) data voltage (V2=V1−Vb) can be supplied to each of the first and second pixel electrodes 64, 48 of the negative (−) liquid crystal cell. The reference voltage V1 is supplied to the common electrode. As a result, the three electrode liquid crystal display panel using the thin film transistor substrate shown in FIG. 4 can be driven by the dot inversion method.

Figure 5:
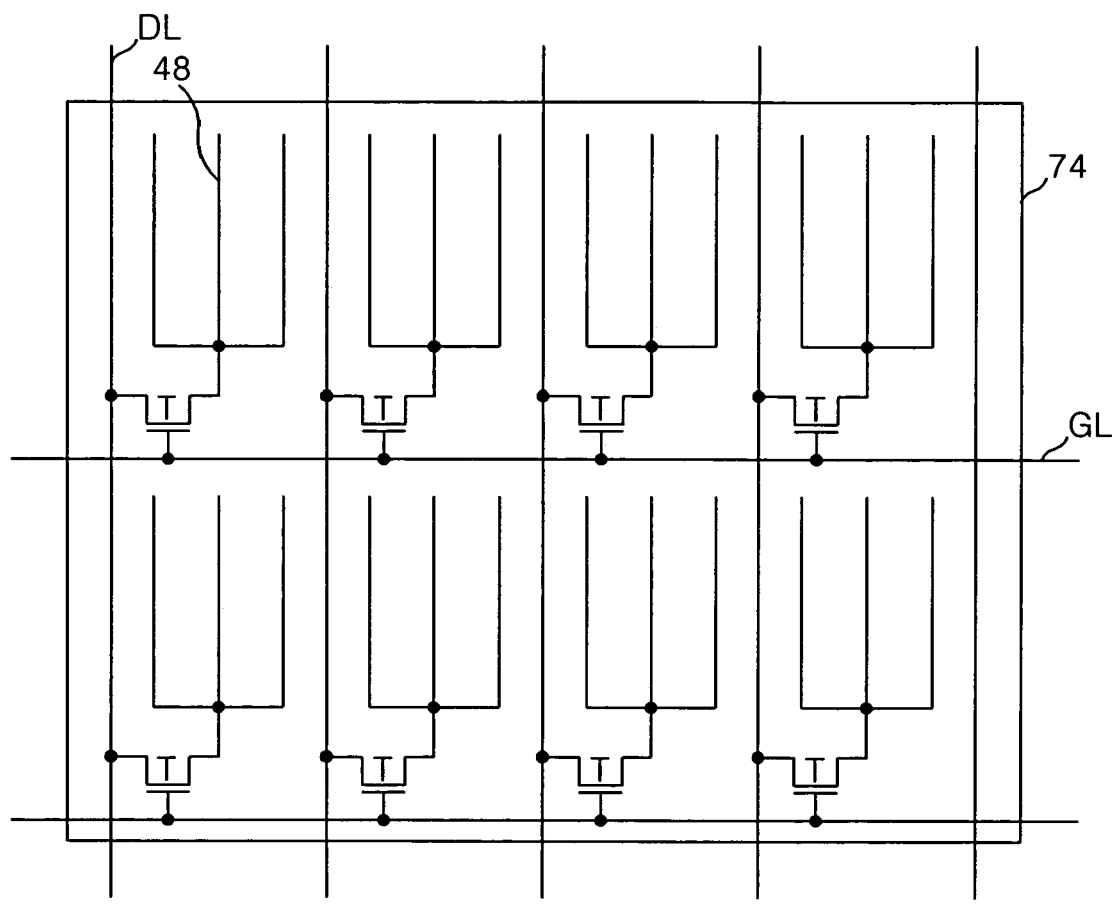
FIG. 5 is a plane view illustrating the structure of a thin film transistor substrate in the liquid crystal display panel according to a second embodiment of the present invention.

FIG. 5 is a plane view illustrating the structure of a thin film transistor substrate in a three electrode liquid crystal panel which is used in a frame inversion method.

The thin film transistor substrate shown in FIG. 5 has the same components as the thin film transistor substrate shown in FIG. 4 except that a first pixel electrode 74 is formed to be a single integrated electrode structure over the entire surface, thus a description for the repeated components will be omitted.

The first pixel electrode 74 shown in FIG. 5 is formed over the entire surface of the thin film transistor substrate in the same manner as the common electrode of the color filter substrate. The maximum voltage Vmax and the minimum voltage Vmin of the data driver is alternately supplied to the first pixel electrode 74 for each frame. The positive (+) data voltage (V2=V1+Vb) and the negative (−) data voltage (V2=V1−Vb) are alternately supplied to the second pixel electrode through the data line DL and the thin film transistor T for each frame. Accordingly, as in TABLE 1, the maximum voltage Vmax and the positive (+) data voltage (V2=V1+Vb) can be supplied to each of the first and second pixel electrodes 74, 48 in the positive (+) frame, and the minimum voltage Vmin and the negative (−) data voltage (V2=V1−Vb) can be supplied to each of the first and second pixel electrodes 74, 48 in the negative (−) frame. And, the reference voltage V1 is supplied to the common electrode.

Differently from this, the reference voltage V1 might be supplied to the first pixel electrode 74 and the maximum voltage Vmax and the minimum voltage Vmin might alternately be supplied to the common electrode for each frame.

As a result, the three electrode liquid crystal display panel using the thin film transistor substrate shown in FIG. 5 can be driven by the frame inversion method.

Figure 6:
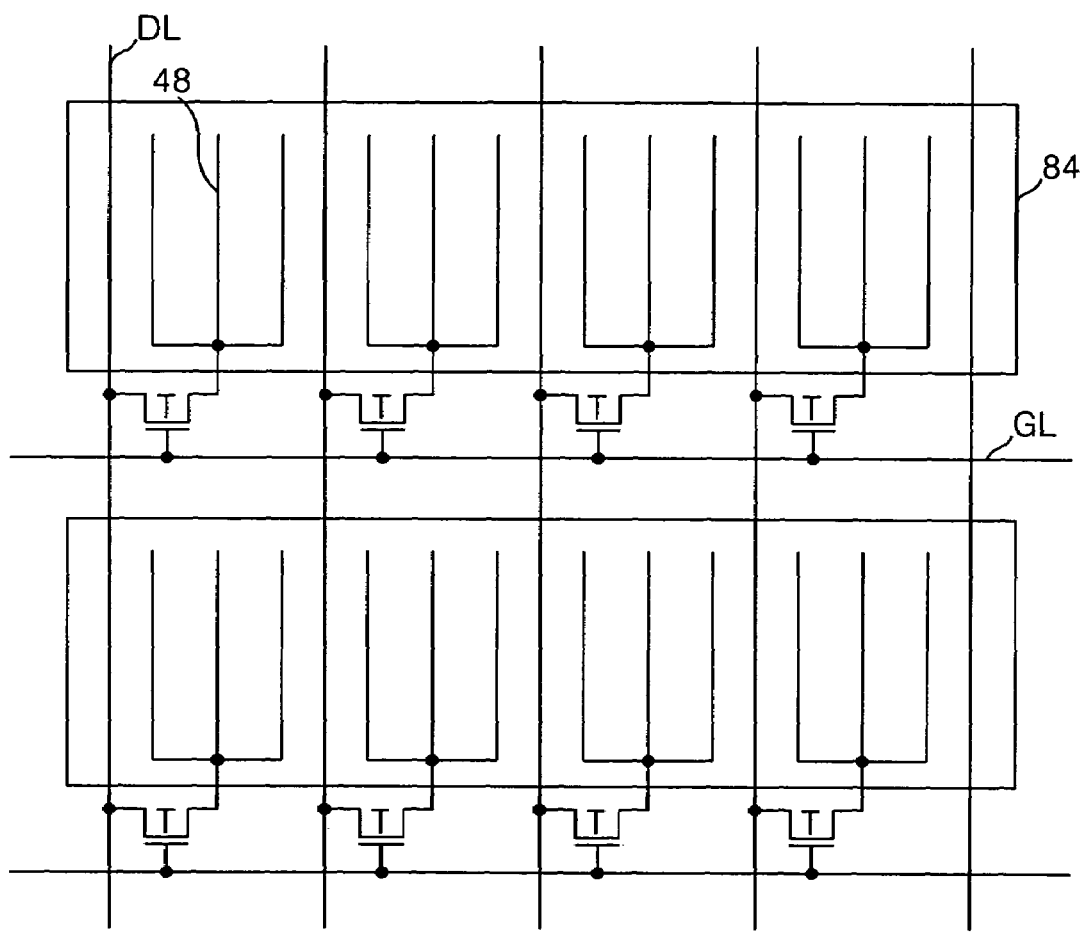
FIG. 6 is a plane view illustrating the structure of a thin film transistor substrate in the liquid crystal display panel according to a third embodiment of the present invention.

FIG. 6 is a plane view illustrating the structure of a thin film transistor substrate in a three electrode liquid crystal panel which uses a line inversion method.

The thin film transistor substrate shown in FIG. 6 has the same components as the thin film transistor substrate shown in FIG. 4 except that a first pixel electrode 84 is formed in a line electrode structure where the first pixel electrode 84 is divided for each horizontal line, thus a description for the repeated components will be omitted.

The first pixel electrode 84 shown in FIG. 6 is formed in a line electrode structure where the first pixel electrode 84 is divided for each horizontal line. The maximum voltage Vmax and the minimum voltage Vmin are alternately supplied to the first pixel electrode 84 through the pad for each horizontal line. The positive (+) data voltage (V2=V1+Vb) and the negative (−) data voltage (V2=V1−Vb) are alternately supplied to the second pixel electrode through the data line DL and the thin film transistor T for each horizontal line. Accordingly, as in TABLE 1, the maximum voltage Vmax and the positive (+) data voltage (V2=V1+Vb) can be supplied to each of the first and second pixel electrodes 84, 48 in the positive (+) horizontal line, and the minimum voltage Vmin and the negative (−) data voltage (V2=V1−Vb) can be supplied to each of the first and second pixel electrodes 84, 48 in the negative (−) horizontal line. The reference voltage V1 is supplied to the common electrode.

As a result, the three electrode liquid crystal display panel using the thin film transistor substrate shown in FIG. 6 can be driven by the line inversion method.

On the other hand, if the first pixel electrode 84 is formed to be divided for each vertical line so as to alternately supply the maximum voltage Vmax and the minimum voltage Vmin for each vertical line and the second pixel electrode 48 alternately supplies the positive and negative data voltage for each data line, the three electrode liquid crystal display panel can be driven in a column inversion method.

Figure 7:
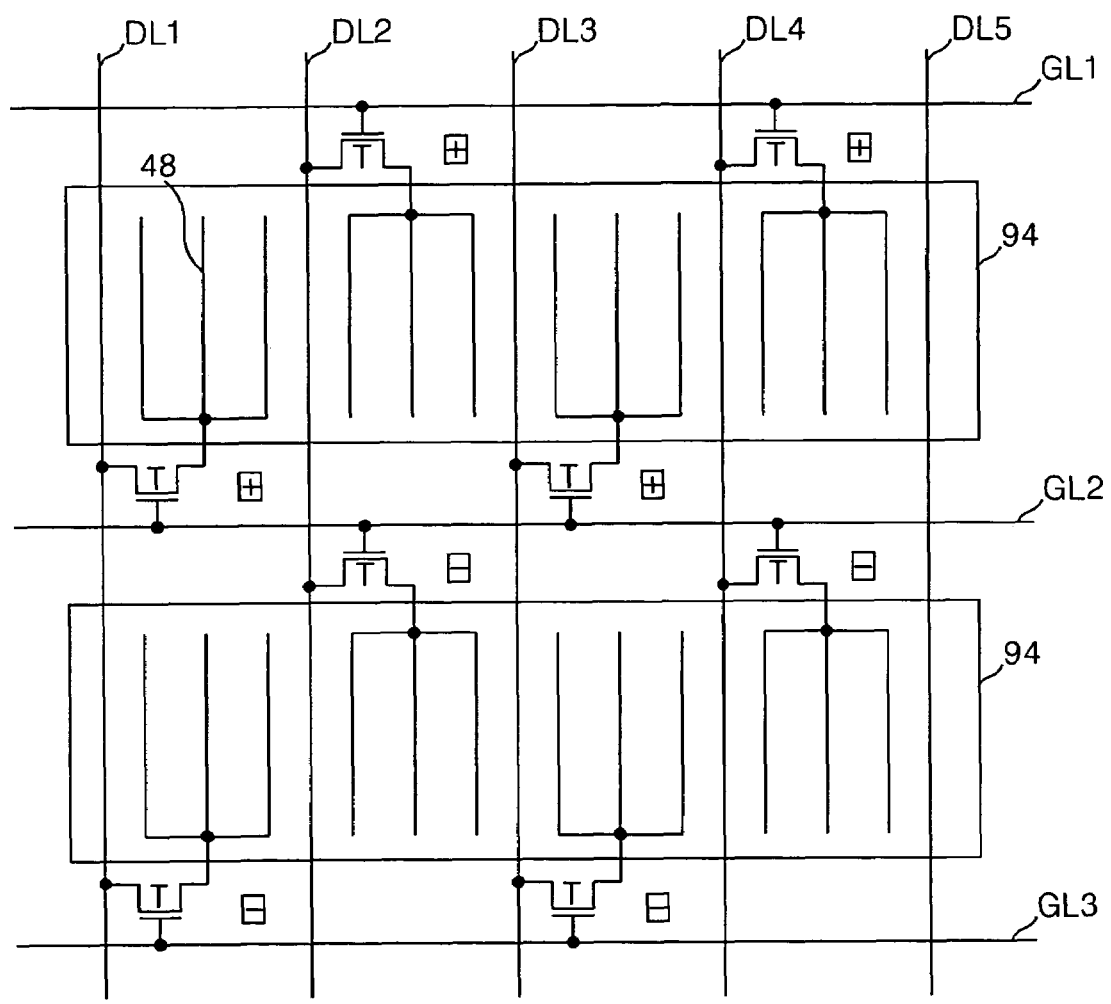
FIG. 7 is a plane view illustrating the structure of a thin film transistor substrate in the liquid crystal display panel according to a fourth embodiment of the present invention.

FIG. 7 is a plane view illustrating another structure of the thin film transistor in the three electrode liquid crystal display panel, which may be used with the line inversion method.

The thin film transistor substrate shown in FIG. 7 has the same components as the thin film transistor substrate shown in FIG. 6 except that the thin film transistor included in one horizontal line is alternately connected to two gate lines $GL_n$, $GL_{n-1}$, thus a description for the repeated components will be omitted.

The first pixel electrode 94 shown in FIG. 7 is formed in a line electrode structure where the first pixel electrode 94 is divided for each horizontal line. The maximum voltage Vmax and the minimum voltage Vmin are alternately supplied to the first pixel electrode 94 through the pad.

The thin film transistor TFT included in one horizontal line is alternately connected to the two gate lines $GL_n$, $GL_{n-1}$, and the connection structure of the thin film transistor is repeated in the same manner for each horizontal line. Accordingly, the liquid crystal cells can be driven using the line inversion method even in case of using a dot inversion data driver.

For example, in a first horizontal period where a first gate line GL1 is driven, the positive (+) data voltage (V2=V1+Vb) is supplied through the data line DL2, DL4 and the thin film transistor T to the second pixel electrode 48 of second and fourth liquid crystal cell areas in a first horizontal line. In a second horizontal period where a second gate line GL2 is driven, the positive (+) data voltage (V2=V1+Vb) is supplied through the data line DL1, DL3 and the thin film transistor T to the second pixel electrode 48 of first and third liquid crystal cell areas in a first horizontal line. In this case, the maximum voltage Vmax is supplied to the first pixel electrode 94 of the first horizontal line and the reference voltage V1 is supplied to the common electrode. Accordingly, the positive (+) voltage is supplied to the first horizontal line.

Further, in the second horizontal period, the negative (−) data voltage (V2=V1−Vb) is supplied through the data line DL2, DL4 and the thin film transistor T to the second pixel electrode 48 of the second and fourth liquid crystal cell areas in a second horizontal line. Then, in a third horizontal period when the third gate line GL3 is driven, the negative (−) data voltage (V2=V1−Vb) is supplied through the data line DL1, DL3 and the thin film transistor T to the second pixel electrode 48 of first and third liquid crystal cell areas in a second horizontal line. In this case, the minimum voltage Vmin is supplied to the first pixel electrode 94 of the second horizontal line and the reference voltage V1 is supplied to the common electrode. Accordingly, the positive (+) voltage is supplied to the second horizontal line.

As a result, the three electrode liquid crystal display panel using the thin film transistor substrate shown in FIG. 7 can be driven using the line inversion method resulting in a dot inversion data driver.

As described above, the three electrode liquid crystal display panel and the driving method thereof according to the present invention selectively supplies the maximum voltage Vmax and the minimum voltage Vmin of the data driver to the first pixel electrode, supplies the medium voltage between the maximum voltage Vmax and the minimum voltage Vmin as the reference voltage V1 to the common electrode, and selectively supplies the positive data voltage (V2=V1+Vb) and the negative data voltage (V2=V1−Vb) on the basis of the reference voltage V1 in a range between the maximum voltage Vmax and the minimum voltage Vmin to the second pixel electrode, thereby AC-driving the liquid crystal.

Further, the three electrode liquid crystal display panel and the driving method thereof according to the present invention includes different electrode structures for the first pixel electrode in accordance with the inversion method and supplies the voltage to each of the liquid crystal cells having three electrodes, thereby enabling to drive the liquid crystal cells by the dot inversion, frame inversion, and line inversion methods.

Further, the three electrode liquid crystal display panel and the driving method thereof according to the present invention has a first pixel electrode with a horizontal line electrode structure and where the thin film transistor connected to the second pixel electrode is alternately connected to two adjacent gate lines, thus the liquid crystal cells can be driven by the line inversion method by use of the dot inversion data driver.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
    a first pixel electrode formed on a first substrate, wherein the first pixel electrode selectively receives a maximum voltage and a minimum voltage;
    an insulating film formed on the first pixel electrode;
    a second pixel electrode formed on the insulating film wherein the second pixel electrode receives a positive data voltage and a negative data voltage that are relative to the medium voltage in a range between the maximum voltage and the minimum voltage;
    a common electrode disposed on a second substrate which is bonded with the first substrate with a liquid crystal therebetween, wherein the common electrode receives a medium voltage between the maximum voltage and the minimum voltage;
    a thin film transistor that is connected to the second pixel electrode on the first substrate and that supplies the positive and negative data voltages from a drive circuit to the second pixel electrode;
    a gate line and a data line which are connected to the thin film transistor; and
    a pad that is connected to the first pixel electrode on the first substrate and that supplies the maximum voltage and the minimum voltage from the drive circuit to the first pixel electrode,
    wherein the liquid crystal is driven with an alternating current.

2. The liquid crystal display panel according to claim 1, wherein as a voltage of the second pixel electrode diverges from a voltage of the first pixel electrode, as a horizontal electric field component increases to drive the liquid crystal in a white state, and as the voltage of the second pixel electrode converges to the voltage of the first pixel electrode, a vertical electric field component increases to drive the liquid crystal in a black state.

3. The liquid crystal display panel according to claim 1, wherein a positive voltage is applied to the liquid crystal if the maximum voltage is applied to the first pixel electrode and the positive data voltage is applied to the second pixel electrode, and a negative voltage is applied to the liquid crystal if the minimum voltage is applied to the first pixel electrode and the negative data voltage is applied to the second pixel electrode.

4. The liquid crystal display panel according to claim 1, wherein the common electrode covers the entire surface of the second substrate, and the first pixel electrode has a structure including a plurality of stripes corresponding to a line of liquid crystal cells that are defined by the crossing of the gate line and the data line.

5. The liquid crystal display panel according to claim 4, wherein the first pixel electrode has a dot electrode structure for each liquid crystal cell, and the first pixel electrode is commonly connected to a first pixel electrode in another liquid crystal cell with the same polarity.

6. The liquid crystal display panel according to claim 5, wherein any one voltage of the maximum voltage and the minimum voltage, which is opposite to that of an adjacent first pixel electrode in vertical and horizontal directions, is applied to the first pixel electrode, and a data voltage of a polarity, which is opposite to that of an adjacent second pixel electrode in the vertical and horizontal directions, is applied to the second pixel electrode, thereby inverting the polarity of each liquid crystal cell.

7. The liquid crystal display panel according to claim 4, wherein the first pixel electrode covers an entire surface of the first substrate.

8. The liquid crystal display panel according to claim 7, wherein the maximum voltage and the minimum voltage are alternatively applied to the first pixel electrode for each frame, and the positive and negative data voltages are alternatively applied to the second pixel electrode for each frame, thereby inverting the polarity of the liquid crystal cell each frame.

9. The liquid crystal display panel according to claim 7, wherein the maximum voltage and the minimum voltage are alternatively applied to the common electrode for each frame, and the positive and negative data voltages are alternatively applied to the second pixel electrode for each frame, thereby inverting the polarity of the liquid crystal cell each frame.

10. The liquid crystal display panel according to claim 4, wherein the first pixel electrode is formed in a line electrode structure where the first pixel electrode is divided for each vertical or horizontal line.

11. The liquid crystal display panel according to claim 10, wherein the maximum voltage and the minimum voltage are alternatively applied to the first pixel electrode for each horizontal or vertical line, and the positive and negative voltages are alternatively applied to the second pixel electrode for each horizontal or vertical line, thereby inverting the polarity of the liquid crystal cell for each horizontal or vertical line.

12. The liquid crystal display panel according to claim 10, wherein when the first pixel electrode is divided for each horizontal line, thin film transistors along a horizontal line are alternately connected to two adjacent gate lines.

13. The liquid crystal display panel according to claim 12, wherein the data line supplies a data voltage of which the polarity is inverted for each horizontal and vertical line, thereby making the polarity of the liquid crystal cell inverted for each cell.

14. A liquid crystal display panel, comprising:
a first pixel electrode formed on a first substrate, wherein the first pixel electrode receives a medium voltage with a voltage level between the maximum voltage and the minimum voltage;
an insulating film formed on the first pixel electrode;
a second pixel electrode formed on the insulating film, wherein the second pixel electrode receives a positive data voltage and a negative data voltage that are relative to the medium voltage in a range between the maximum voltage and the minimum voltage;
a common electrode disposed on a second substrate which is bonded with the first substrate with a liquid crystal therebetween, wherein the common electrode selectively receives a maximum voltage and a minimum voltage;
a thin film transistor that is connected to the second pixel electrode on the first substrate and that supplies the positive and negative data voltages from a drive circuit to the second pixel electrode;
a gate line and a data line which are connected to the thin film transistor; and
a pad that is connected to the first pixel electrode on the first substrate and that supplies the maximum voltage and the minimum voltage from the drive circuit to the first pixel electrode,
wherein the liquid crystal is driven with an alternating current.

15. The liquid crystal display panel according to claim 14, wherein the common electrode covers the entire surface of the second substrate, and the first pixel electrode has a structure including a plurality of stripes corresponding to a line of liquid crystal cells that are defined by the crossing of the gate line and the data line.

16. A driving method of a liquid crystal display panel, comprising:
selectively applying a maximum voltage and a minimum voltage to a first pixel electrode formed on a first substrate;
applying a medium voltage between the maximum voltage and the minimum voltage to a common electrode formed on a second substrate, which together with the first substrate has a liquid crystal therebetween; and
applying a positive data voltage and a negative data voltage that are relative to the medium voltage in a range between the maximum voltage and the minimum voltage to a second pixel electrode formed on an insulating film, wherein the insulating film is formed between the first pixel electrode and the second electrode,
wherein the liquid crystal is driven with an alternating current, and the maximum voltage and the minimum voltage are applied through a pad.

17. A driving method of a liquid crystal display panel, comprising:
applying a medium voltage with a voltage level between the maximum voltage and the minimum voltage to a first pixel electrode of a second substrate;
selectively applying a maximum voltage and a minimum voltage to a common electrode formed on a second substrate, which together with the first substrate has a liquid crystal therebetween; and
applying a positive data voltage and a negative data voltage that are relative to the medium voltage in a range between the maximum voltage and the minimum voltage to a second pixel electrode formed on an insulating film, wherein the insulating film is formed between the first pixel electrode and the second electrode, wherein the liquid crystal is driven with an alternating current and the common electrode covers an entire surface of the second substrate and the maximum voltage and the minimum voltage for each frame are alternatively applied to the common electrode, and the positive and negative data voltages for each frame are alternatively applied to the second pixel electrode which is independent for each liquid crystal cell, thereby inverting the polarity of the liquid crystal cell for each frame.

18. The driving method according to any one of claims 16 and 17, wherein the positive and negative data voltages are applied using a data line and a thin film transistor.

19. The driving method according to claim 16, wherein as a voltage of the second pixel electrode diverges from a voltage of the first pixel electrode, a horizontal electric field component increases to drive the liquid crystal in a white state, and as the voltage of the second pixel electrode converges to the voltage of the first pixel electrode, a vertical electric field component increases to drive the liquid crystal in a black state.

20. The driving method according to claim 16, wherein a positive voltage is applied to the liquid crystal if the first pixel electrode applies the maximum voltage and the second pixel electrode applies the positive data voltage, and a negative voltage is applied to the liquid crystal if the first pixel electrode applies the minimum voltage and the second pixel electrode applies the negative data voltage.

21. The driving method according to claim 16, wherein the first pixel electrode formed in a dot electrode structure for each liquid crystal cell applies any one voltage of the maximum voltage and the minimum voltage which is opposite to that of an adjacent first pixel electrode in vertical and horizontal directions, and the second pixel electrode which is independent for each liquid crystal cell applies a data voltage of a polarity which is opposite to that of an adjacent second pixel electrode in the vertical and horizontal directions, thereby inverting the polarity of each liquid crystal cell.

22. The driving method according to claim 16, wherein the first pixel electrode covers an entire surface of the first substrate and the maximum voltage and the minimum voltage for each frame are alternatively applied to the first pixel electrode, and the positive and negative data voltages for each frame are4 alternatively applied to the second pixel electrode, which is independent for each liquid crystal cell, thereby inverting the polarity of the liquid crystal cell for each frame.

23. The driving method according to claim 16, wherein the maximum voltage and the minimum voltage for each horizontal line are alternatively applied to the first pixel electrode divided for each horizontal line, and the positive and negative voltages for each horizontal line are alternatively applied to the second pixel electrode which is independent for each liquid crystal cell, thereby inverting the polarity of each horizontal line.

24. The driving method according to claim 16, wherein the maximum voltage and the minimum voltage for each vertical line are alternatively applied to the first pixel electrode divided for each vertical line, and the positive and negative voltages for each vertical line are alternatively applied to the second pixel electrode, which is independent for each liquid crystal cell, thereby inverting the polarity of the liquid crystal cell for each vertical line.

25. The driving method according to claim 16, wherein when the second pixel electrode is divided for each liquid crystal cell and connected to a thin film transistor and the thin film transistor is alternately connected to two adjacent gate lines, the first pixel electrode alternately applies the maximum voltage and the minimum voltage for each horizontal line, and a data line connected to the thin film transistor applies a data voltage of which the polarity is inverted for each horizontal and vertical line, thereby inverting the polarity of the liquid crystal cell for each horizontal line.

* * * * *